(12) United States Patent
Schuermann et al.

(10) Patent No.: US 9,180,638 B2
(45) Date of Patent: Nov. 10, 2015

(54) METHOD AND DEVICE FOR PRODUCING LARGE CYLINDRICAL STRUCTURES

(75) Inventors: Klaus Schuermann, Juechen (DE); Lothar Sebastian, Duisburg (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 148 days.

(21) Appl. No.: 13/883,804

(22) PCT Filed: Nov. 16, 2011

(86) PCT No.: PCT/EP2011/070212
§ 371 (c)(1),
(2), (4) Date: May 31, 2013

(87) PCT Pub. No.: WO2012/066017
PCT Pub. Date: May 24, 2012

(65) Prior Publication Data
US 2013/0340927 A1 Dec. 26, 2013

(30) Foreign Application Priority Data
Nov. 19, 2010 (DE) .......................... 10 2010 051 739

(51) Int. Cl.
*B29D 99/00* (2010.01)
*B29C 33/20* (2006.01)
(Continued)

(52) U.S. Cl.
CPC .............. *B29D 99/001* (2013.01); *B29C 33/02* (2013.01); *B29C 33/20* (2013.01); *B29C 33/202* (2013.01);
(Continued)

(58) Field of Classification Search
CPC ...... B29D 99/001; B29D 23/00; B29C 33/20; B29C 33/202; B29C 33/485; B29C 45/641

USPC .......................................................... 425/595
See application file for complete search history.

(56) References Cited

U.S. PATENT DOCUMENTS 5,266,259 A * 11/1993 Harrison et al. .............. 264/257
7,048,024 B2   5/2006 Clark et al.
(Continued)

FOREIGN PATENT DOCUMENTS

DE    2716070 A       12/1978
FR    2870776 A1 *   12/2005
(Continued)

OTHER PUBLICATIONS

Machine translation of French Patent Publication No. FR-2870776A1, originally published Dec. 2005, 5 pages.*

*Primary Examiner* — William Bell
(74) *Attorney, Agent, or Firm* — Andrew Wilford

(57) ABSTRACT

A large cylindrically tubular molded part is made by assembling a plurality of inner segments into a tubularly cylindrical mold inner part having an outer surface centered on an axis and then juxtaposing reinforcing fibers with the outer surface. Then a plurality of outer segments are assembled into a tubularly cylindrical mold outer part coaxial with the mold inner part and having an inner surface radially confronting the outer surface of the inner part and forming therewith a mold cavity containing the reinforcing fibers. Multiple turns of prestressing cables are then wound under tension around the outer mold part to press the outer segments angularly together and the cavity is with a hard-curing plastic that is cured in the cavity to form the molded part reinforced with the reinforcing fibers. The inner segments are radially inwardly and the outer segments radially outwardly retracted then to demold the molded part.

11 Claims, 4 Drawing Sheets

(51) Int. Cl.
*B29C 45/64* (2006.01)
*B29C 33/02* (2006.01)
*B29C 33/48* (2006.01)
*B29C 45/26* (2006.01)
*B29C 70/46* (2006.01)
*B29C 70/48* (2006.01)
*B64F 5/00* (2006.01)
*B29L 31/30* (2006.01)
*B64C 1/00* (2006.01)

(52) U.S. Cl.
CPC ............ *B29C 33/485* (2013.01); *B29C 45/261* (2013.01); *B29C 45/641* (2013.01); *B29C 70/462* (2013.01); *B29C 70/48* (2013.01); *B64F 5/0009* (2013.01); *B29L 2031/3082* (2013.01); *B64C 2001/0072* (2013.01); *Y02T 50/433* (2013.01); *Y10T 156/1028* (2015.01)

(56) References Cited

U.S. PATENT DOCUMENTS

| | | |
|---|---|---|
| 2002/0112919 A1* | 8/2002 | Graham, Jr. .................. 182/116 |
| 2005/0211843 A1 | 9/2005 | Simpson et al. |
| 2008/0245929 A1 | 10/2008 | Patel et al. |
| 2010/0155984 A1 | 6/2010 | Hollensteiner et al. |
| 2010/0276069 A1 | 11/2010 | Lengsfeld et al. |

FOREIGN PATENT DOCUMENTS

| | | |
|---|---|---|
| GB | 2156728 A | 10/1985 |
| WO | WO 2007148301 A2 * | 12/2007 |

* cited by examiner

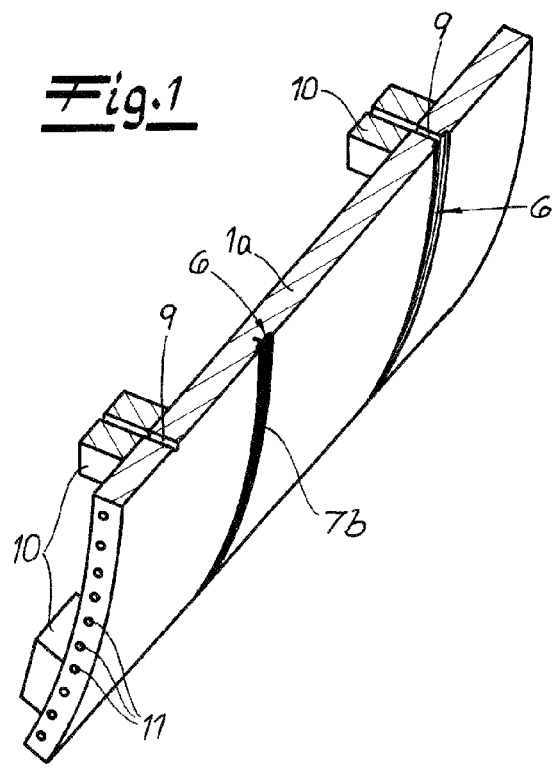
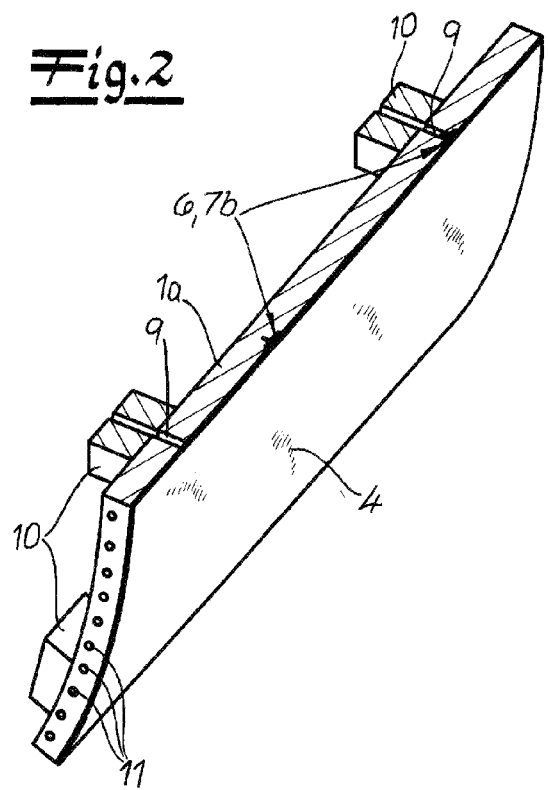

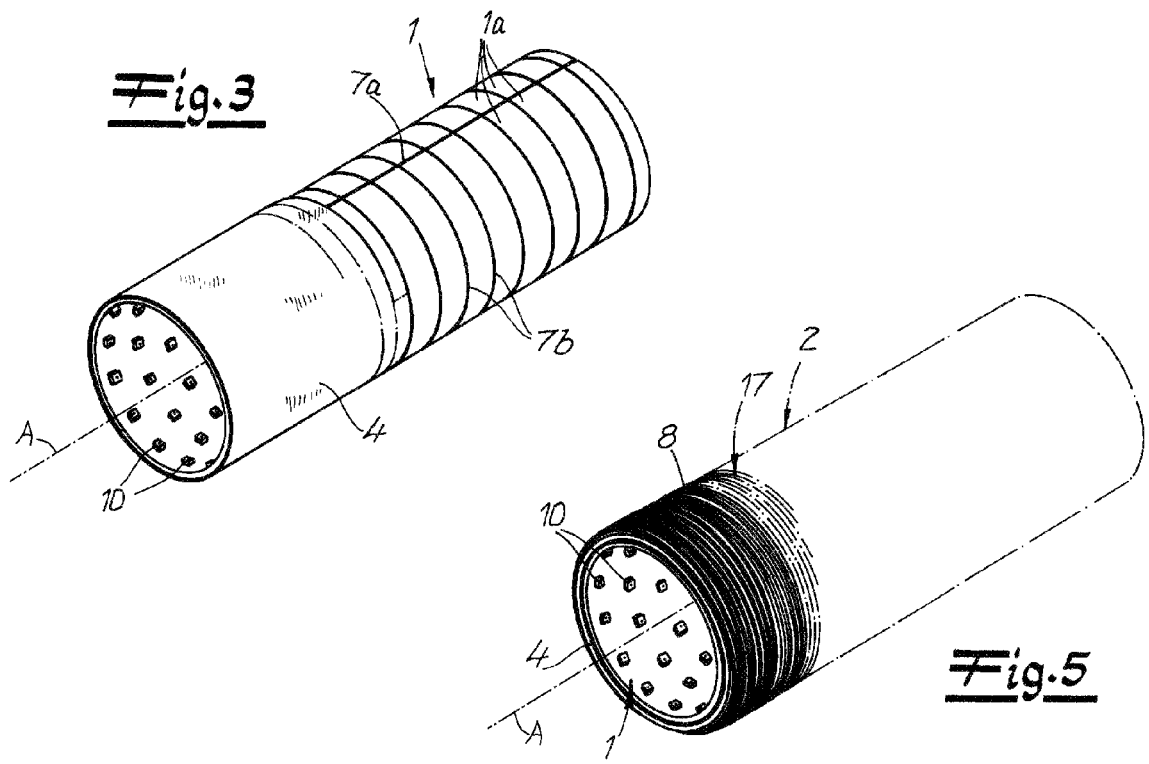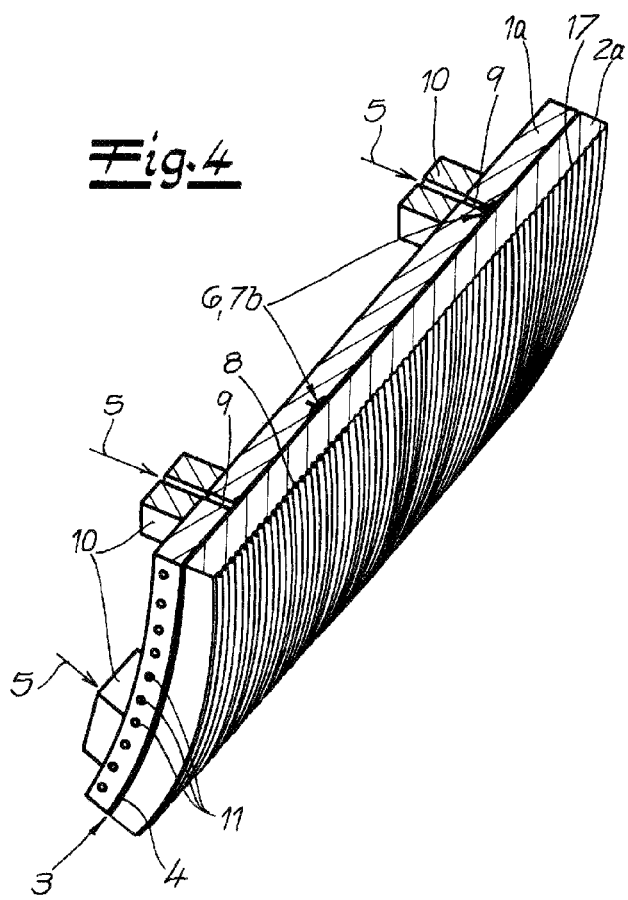

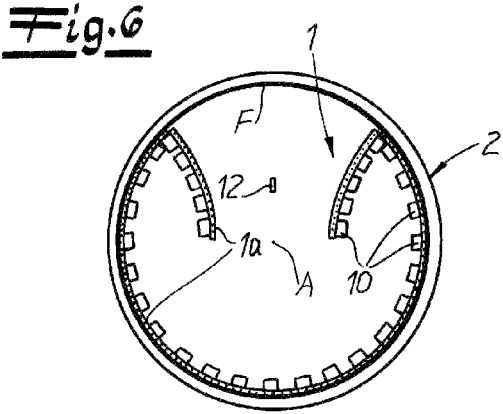
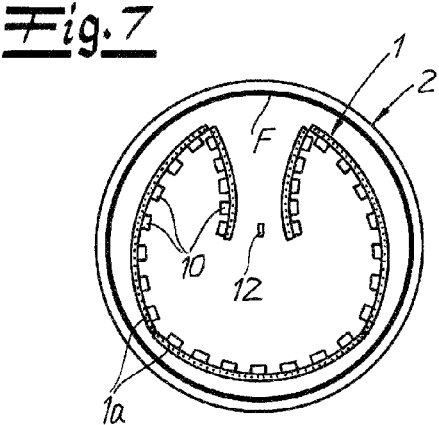
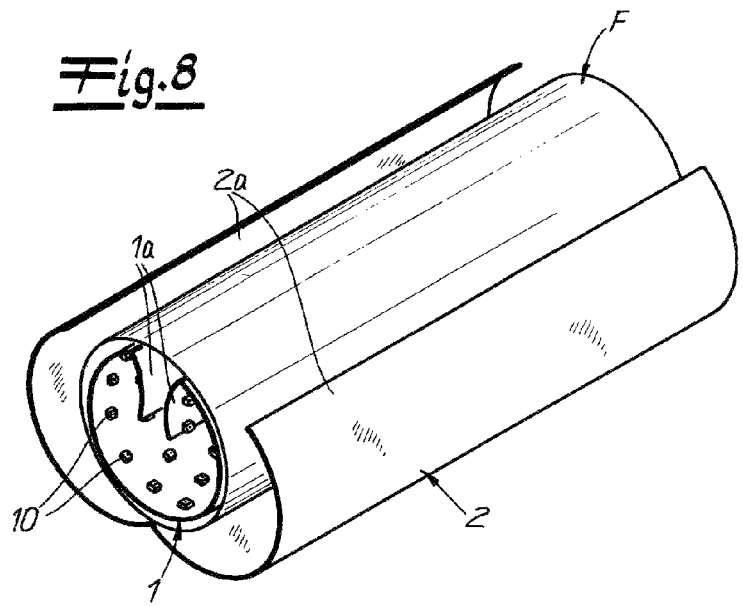

METHOD AND DEVICE FOR PRODUCING LARGE CYLINDRICAL STRUCTURES

CROSS REFERENCE TO RELATED APPLICATIONS

This application is the US-national stage of PCT application PCT/EP2011/070212 filed 16 Nov. 2011 and claiming the priority of German patent application 102010051739.9 itself filed 19 Nov. 2010.

FIELD OF THE INVENTION

The invention relates to a method of making large cylindrical structures or large cylindrical molded parts from fiber-reinforced plastic.

In the manufacture of large cylindrical parts, in particular fuselage parts for the manufacture of aircraft, fibers, preferably one or more fiber mats, and a curable plastic material are introduced into a cavity between a cylindrical inner mold part and a cylindrical outer mold part. The plastic material is then cured. The plastic material generally relates to a thermosetting synthetic material that is used to make fiber-reinforced plastics and thus fiber composites. These fibers are embedded in a plastic matrix. The fibers are, for example, glass fibers and/or carbon fibers, although they may also be other types of fibers. Although the fibers can be loose fibers, they are preferably provided in the form of semifinished materials as fiber mats or the like. The terms large structure or large molded part refers, in particular, to a cylindrical molded part that has a diameter of at least 2 m, preferably, at least 3 m. In particular, this can relate to fuselage parts for the manufacture of aircraft.

The approach is well-known in the manufacture of aircraft whereby the fuselage, in particular, tubular, in particular, barrel-shaped fuselage sections are prefabricated individually and then assembled in a final assembly stage to make the finished fuselage. In terms of materials, increasing use is being made of fiber composites, such as, for example, carbon-fiber-reinforced plastics (CFRP). This approach enables a fuselage to be made that has high strength but also at the same time light weight.

A method of making a tubular structural part has been disclosed in DE 10 2007 060 029 [US 2010/0276069] wherein a tubular mold was provided that includes an inner surface that is shaped so as to conform to the outer surface of the structural part. The inner mold surface is created by an expandable substrate that is shaped so that in a nonexpanded state the substrate fills the mold while leaving an expansion gap between the substrate surface and the mold surface. The substrate is mounted in the mold and the fiber fabric is pressed against the mold surface by expanding the substrate. The fiber fabric is then impregnated with a curable matrix.

In addition, the use of automatic winding machines for the fiber mats has been proposed for the purpose of producing, for example, fuselage parts for the manufacture of aircraft (see U.S. Pat. No. 7,048,024).

Also known from the area of container technology are pressure vessels, for example, for nuclear facilities, whereby prestressed assemblies are mounted on the outside of the pressure vessel, on which assemblies prestressing elements in the form of cables are wound by a winder (see DE 27 16 020). Developments of this type have not influenced the construction, for example, of fuselage parts for aircraft manufacture.

OBJECT OF THE INVENTION

The object of this invention is to provide a method by which large structures or large molded parts, in particular, fuselage parts can be made economically and of high quality, in particular, in the manufacture of aircraft.

SUMMARY OF THE INVENTION

In order to attain this object, the invention teaches a generic method of making large cylindrical structures or large cylindrical molded parts where the cylindrical inner mold part is formed by a plurality of angularly spaced inner segments, and the outer mold part is assembled from a plurality of angularly spaced outer segments, and where the outer segments are braced against the inner mold part by one or more bracing cables that are wound around the outer mold part or the outer segments, the fibers or fiber mats being interposed.

The invention is based first of all on the idea that the finished large structures or large molded parts can be easily removed after molding if the inner mold part is formed by a plurality of segments so as to enable these segments to be easily removed "inwardly." Particularly in the case of materials that have a negative temperature coefficient and thus retract during curing, this approach has the advantage of enabling easy demolding of the part. In addition, however, the outer mold part is formed by a plurality of angularly spaced outer segments, thereby also providing improved handling. At the same time, strong forces that occur during molding or curing in this type of configuration can be easily absorbed since the outer mold part is braced against the inner mold part by the bracing cables wound around the outer mold part. This ensures a simple design for the mold, simple manufacture, and, in particular, easy removal from the mold or easy demolding of the finished part.

The inner mold part is preferably assembled from the inner segments, and the fibers or fiber mats are then placed on the inner mold part, for example, wound around the inner mold part. The outer mold part formed from the individual outer segments is then mounted or assembled, and braced by the bracing cables. Finally, the molding compound is then introduced into the cavity, for example, by injection. It is advantageous here to regulate the temperature of, preferably heat, the mold before and/or during molding. The molding compound then cures around the fibers.

In light of the fact that, for example, fuselage parts for aircraft are generally provided with reinforcement elements, the invention proposes a preferred development whereby reinforcement elements, for example, reinforcement wires, strands, or the like, are placed on the inner mold part before placement of the outer mold part, and preferably also before placement of the fibers or fiber mats. To this end, the inner mold part generally has recesses formed essentially as grooves for the reinforcement elements, on the outer surface facing the outer mold part and thus on the molding surface. The reinforcement elements can, for example, be curved wires and/or reinforcement strands that run axially. The described approach enables these reinforcement elements, typically found in aircraft manufacture, to be readily integrated into the manufacture process according to the invention.

In order to remove the molded part from the mold, the invention furthermore proposes an approach whereby the inner mold part is removed first by retracting the inner segments radially inward. An advantageous approach to do this is to separate the inner segments at their adjoining end faces and then essentially fold them inward. It is also possible for the inner segments (or the plurality of inner segments) to be pivoted to each other, or also to be created by individual sections. The adjoining end faces or abutting surfaces of the individual segments here can be designed so as to create in the assembled state a stable structure that can withstand the pressure of the prestressed outer mold part. An advantageous approach to do this is to insert a stabilizing part, for example, a wedge, strip, or the like, between the last-inserted inner segments as the inner mold part is assembled. This is removed first during demolding, thereby allowing the inner segments to easily fold inward.

In a modified embodiment, it is possible for the individual inner segments to be attached together to an automatic retractor that can pull the individual inner segments, either simultaneously or in succession, by means of one or more appropriate actuators. This type of retractor can include, for example, a central holder or a hub on which the individual inner segments are pivoted via interposing connecting rods. Rotating the central holder then enables the individual inner segments to be pulled inward by the connecting rods. The connecting rods also enable relatively strong forces oriented radially during the manufacture process to be withstood.

One essential aspect of the invention relates to winding the described bracing cables, for example, steel cables, onto the assembled outer mold part. A winder is generally provided for this purpose. In an especially preferred approach, the assembled mold is itself rotated to wind up the bracing cables, the cables being unwound from one or more cable reels. This eliminates the need to move the heavy cable reels over longer distances around the stationary mold. The cable reels can in fact be fixed in place. The mold is instead made to rotate by an appropriate drive unit such that the cables are pulled off and wound on.

The invention also relates to an apparatus for making large cylindrical structures or large molded parts, in particular, fuselage parts for the manufacture of aircraft, comprising a method as described above. According to the invention, this apparatus includes an inner mold part that is formed by a plurality of inner segments, and an outer mold part that is formed by a plurality of outer segments. In addition, a winder is provided to wind the bracing cables around the outer mold part. The winder preferably includes one or more cable reels from the cables are unreeled. The winder preferably includes a pivot for the mold, the mold being mounted on to this pivot, and the pivotal mount being provided with a rotary drive to rotate the mold as the steel cables are unreeled.

In order to facilitate winding the cables onto the outer mold part or the outer segments and to ensure uniform tensioning, a preferred development of the invention proposes an approach whereby the outside of outer mold part or its outer segments includes at least one helical groove or flute in which the bracing cables are inserted during winding or in which the bracing cables are guided.

The inner and/or the outer mold part, or their segments, are preferably provided with heating passages and/or cooling passages to enable the mold to be heated before and/or during curing. In addition, the mold is provided with appropriate feed passages through which the curable molding compound can be introduced, for example, injected, into the cavity. Delivery of the molding compound is preferably effected through the inner mold part. To this end, multiple delivery passages oriented radially can be incorporated in the inner mold part, which passages discharge into the cavity. These delivery passages are connected to corresponding mixing or injection heads that can be placed on the inside of the inner mold part.

In sum, the invention provides a simple and economic approach to making large structures or large molded parts of high quality from fiber-reinforced plastic, in particular, fuselage parts for aircraft manufacture.

BRIEF DESCRIPTION OF THE DRAWING

The following discussion describes the invention in more detail with reference to a drawing illustrating only one illustrated embodiment. Therein:

FIG. 1 shows a section of an inner mold part for making a fuselage used in the manufacture of aircraft and including an inserted distribution package;

FIG. 2 shows the mold section of FIG. 1 including inserted reinforcement elements and carrying fiber mat;

FIG. 3 shows the complete inner mold part including reinforcement elements as the fiber mat is wound on;

FIG. 4 shows the structure of FIG. 2 including the mounted outer mold part and steel cables that have been partially wound on;

FIG. 5 shows the entire mold including wound-on steel cables (as in FIG. 4);

FIG. 6 is an end view of the object shown in FIG. 5 as removal of the inner mold part begins;

FIG. 7 shows the object shown in FIG. 6 during removal of the inner mold part;

FIG. 8 is a perspective view of the object shown in FIG. 7 during removal of the outer mold part;

SPECIFIC DESCRIPTION OF THE INVENTION

Figure 9:
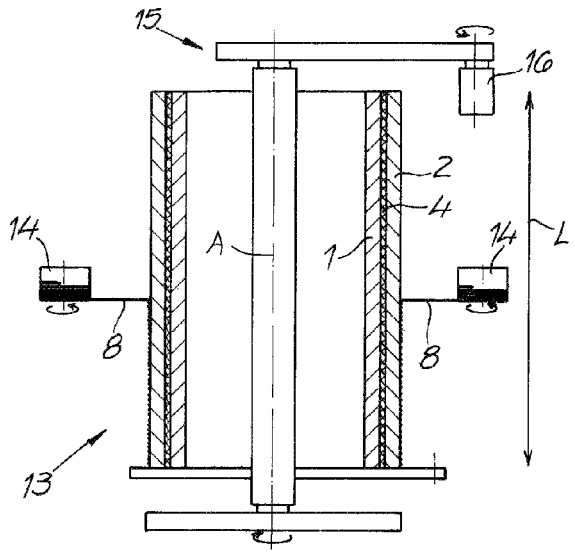
FIG. 9 is a first view of a winder.

The method or the apparatus shown in the figures enables large cylindrical structures, for example, fuselage sections to be made from fiber-reinforced plastic for the manufacture of aircraft.

The mold to make these large structures is formed by an inner mold part 1 on the one side and an outer mold part 2 on the other side, a cavity 3 being created between the inner and outer mold parts. Fiber mats 4 are set in the cavity 3, and a curable plastic compound 5 is then introduced as a matrix into the cavity 3 in order to make the molded part.

The inner mold part 1 according to the invention is formed by a plurality of inner segments 1a distributed about an axis A, while the outer mold part 2 is formed by a plurality of outer segments 2a also arrayed around this axis A.

Assembly of the mold and manufacture of the molded part can be explained by a comparison of FIGS. 1 through 5.

FIG. 1 first of all shows only a portion of the inner mold part 1, or provides a perspective view of an inner segment 1a. It is evident that this inner segment 1a is provided with a plurality of recesses 6 into which reinforcement elements 7a, 7b can be inserted. The reinforcement elements are first of all reinforcement strands 7a running parallel to the cylinder axis, and, secondly, strands 7b that are curved and thus extend circumferentially.

After the reinforcement elements 7a, 7b have been inserted into the recesses or grooves 6, the fiber mat 4 is put in place, specifically preferably wound on. This is evident when comparing FIGS. 2 and 3.

Figure 10:
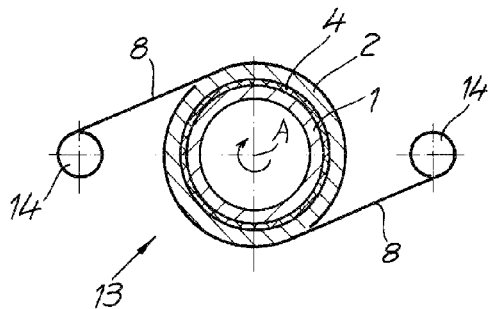
FIG. 10 is a second view of the winder.

After the fiber mat 4 has been completely wound on, the outer mold part 2 that is formed by the outer segments 2a is installed. As shown in FIG. 10, bracing cables 8 are then wound around the outer mold part 2, i.e., the outer mold part 2 is pressed by the cables 8 against the inner mold part 1 through the fiber mat 4. FIGS. 4 and 5 are different views illustrating the mold formed by the inner mold part 1 and the outer mold part 2 where the bracing cables 8 have been partially wound on.

Once the outer mold part 2 has been completely braced against the inner mold part 1, the plastic molding compound 5 indicated by arrows can be injected into the cavity 3.

It is evident that the inner mold part 1 has been provided with (radially extending) passages 9 for introduction of the molding compound, these passages 9 being in turn connected to injection or mixing heads 10. The injection or mixing heads 10 here are mounted on the inside of the inner mold part 1.

The inner mold part 1 and/or the outer mold part 2 are heated before and/or after curing the molding compound. To this end, both the inner mold part 1 and the outer mold part 2 are provided with heating passages 11 that in the embodiment run parallel to the cylinder axis. These are shown only for the inner mold part 1a. Heating enables the molding compound 5 to cure around the fibers or fiber mat 4, thereby creating the large molded part to be made, for example, a fuselage part.

In order to be able to remove this finished molded part F from the mold, the inner mold part 1 is preferably removed first. This is evident when comparing FIGS. 6 through 8.

FIG. 6 clearly shows that a wedge or stop strip 12 is first removed from between two angularly confronting edges of two adjacent inner segments 1a, which wedge or strip 12 can also be called a head piece or keystone, thereby enabling the flanking inner mold segments 1a to be essentially folded together radially inward and removed (FIG. 7). Finally, the outer mold part 2, which in the embodiment is formed by two segments 2a, can be unfolded (see FIG. 8), thereby allowing the finished molded part F to be removed.

The action of winding up the bracing cables 8 is an especially significant aspect of the invention. To this end, a preferred development of the invention provides a winder 13 for winding the steel cables onto the outer mold part 2. The winder in the shown embodiment includes two cable reels 14 from which the steel cables 8 are unreeled. In addition, the winder 13 includes a rotary support 15 for the mold formed by the inner mold part 1 and the outer mold part 2. This rotary support 15 or pivot mount is provided with a rotary drive 16. Thus the mold 1, 2 is rotated by the rotary support 15 to wind the steel cables 8 onto the outer mold part 2, with the result that the steel cables 8 are unreeled from the cable reels 14 (see specifically FIGS. 9 and 10).

The outer mold part 2 is provided with grooves or flutes 17 to ensure that the steel cables are reliably wound onto the outer mold part 2. In the embodiment, this is the flute 17 that spirals around the outer surface of the outer mold part 2. The reels 14 can be moved here axially longitudinally L of the mold so as to allow the turns of the bracing cables 8 to be wound up in succession.

Figure 11A:
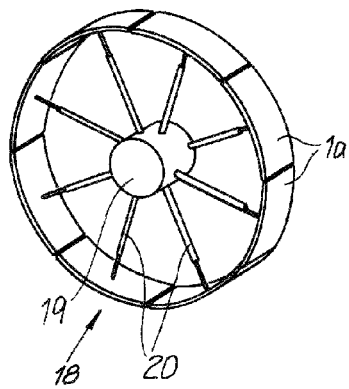
FIGS. 11a, 11b, and 11c are details of a modified embodiment of the invention.
Figure 11B:
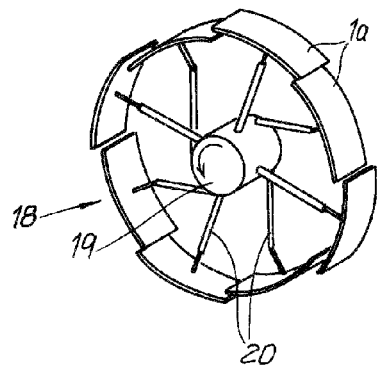
Figure 11C:
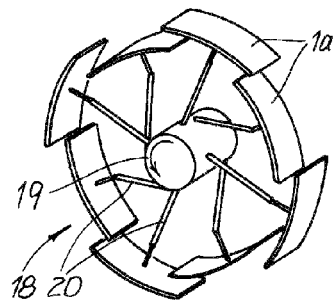

The multipart inner mold part 1 is also an especially significant aspect of the invention since retracting the inner mold part 1 enables the molded part F to be easily demolded. A first embodiment was described with reference to FIGS. 6 through 8. A modified embodiment is shown in FIGS. 11a, 11b, and 11c.

In this embodiment, the inner segments 1a are connected to an automatic retractor 18. This retractor 18 includes a central holder or hub 19 on which the inner segments 1a are pivoted via respective connecting rods 20. A comparison of FIGS. 11a, 11b, and 11c shows that the rotating central hub 19 enables the inner segments 1a to be retracted automatically.

The described method and the apparatus are used preferably to make large structures having a diameter of greater than 3 m, especially preferably greater than 4 m. In this case, the inner mold part and/or the outer mold part are preferably of a wall thickness measuring more than 50 mm, preferably, more than 80 mm, for example, 100 mm or greater. The bracing cable is preferably a steel cable that can be of a diameter greater than 10 mm, preferably, greater than 20 mm, for example, 30 mm or greater.

The invention claimed is:

1. A method of making a large cylindrically tubular molded part, the method comprising the steps of sequentially:
   assembling a plurality of inner segments into a tubularly cylindrical mold inner part having a cylindrical outer surface generally centered on an axis;
   juxtaposing reinforcing fibers with the outer surface;
   assembling a plurality of outer segments into a tubularly cylindrical mold outer part coaxial with the mold inner part and having a cylindrical inner surface radially confronting the outer surface of the inner part and forming therewith a mold cavity containing the reinforcing fibers;
   winding multiple turns of prestressing cables under tension around the outer mold part to press the outer segments angularly together;
   filling the cavity with a hard-curing plastic;
   curing the plastic in the cavity to form the molded part reinforced with the reinforcing fibers; and
   radially inwardly retracting the inner segments and radially outwardly removing the outer segments to demold the molded part.

2. The method according to claim 1, wherein
   the inner mold part formed by the inner segments is first assembled from the inner segments,
   the fibers are then placed on the inner mold part,
   the outer mold part formed by the outer segments is then placed and braced by the prestressing cables, and
   the hard curing plastic is finally introduced into the cavity.

3. The method according to claim 1, further comprising the step of:
   placing reinforcement strands on the inner mold part in outwardly open grooves of the inner mold part before placing the outer mold part and before applying the fibers.

4. The method according to claim 1, wherein the segments forming the inner mold part are retracted radially inward in order to demold the finished molded part before the outer mold segments are retracted.

5. The method according to claim 1, further comprising the steps for winding the cables of:
   rotating the assembled mold to wind up and tension the cables while at the same time unreeling the cables from at least one cable reel.

6. An apparatus for making a large cylindrically tubular molded part, the apparatus comprising:
   a plurality of inner segments assemblable into a tubularly cylindrical mold inner part having a cylindrical outer surface generally centered on an axis, whereby reinforcing fibers can be juxtaposed with the outer surface;
   a plurality of outer segments assemblable into a tubularly cylindrical outer mold part coaxial with the mold inner part and having a cylindrical inner surface radially confronting the outer surface of the inner part and forming therewith a mold cavity containing the reinforcing fibers;
   means for winding multiple turns of prestressing cables under tension around the outer mold part to press the outer segments angularly together;
   means for filling the cavity with a plastic curable in the cavity to form the molded part reinforced with the reinforcing fibers; and means for radially inwardly retracting the inner segments.

7. The apparatus according to claim 6, wherein the means for retracting includes one or more cable reels from which the cable can be unreeled.

8. The apparatus according to claim 6, wherein the means for retracting includes
- a pivot mount for the inner and outer mold parts, and
- a rotary drive connected to the pivot mount to rotate the inner and outer mold parts.

9. The apparatus according to claim 6, wherein outer surfaces of the outer mold segments are formed with at least one spiral groove or flute into which the turns of the cables can be inserted during winding.

10. The apparatus according to claim 6, wherein the inner mold part or the outer mold part is provided with heating or cooling passages, whereby the inner or outer mold part can be cooled or heated to cure the plastic.

11. The apparatus according to claim 6, wherein the inner mold part is provided with an automatic retractor that can radially inwardly retract the inner segments in order to demold the part.

\* \* \* \* \*